June 11, 1968  C. BROAD, JR  3,387,435

SAFETY VALVE FILTER

Filed Oct. 21, 1966

INVENTOR
CHARLES BROAD, JR.

Ronald C. Kamp
ATTY

United States Patent Office 3,387,435
Patented June 11, 1968

3,387,435
SAFETY VALVE FILTER
Charles Broad, Jr., Westchester, Ill., assignor to International Harvester Company, Chicago, Ill., a corporation of Delaware
Filed Oct. 21, 1966, Ser. No. 588,589
7 Claims. (Cl. 55—482)

ABSTRACT OF THE DISCLOSURE

A safety filter positioned downstream of a conventional air cleaner in the induction system of an internal combustion engine, which safety filter retains virtually none of the dirt particles passing through the air cleaner during proper operation thereof, but which retains a sufficient number of the dirt particles passing through the air cleaner during improper operation thereto to substantially restrict the flow of air to, and to noticeably reduce the power output of, the engine.

---

The present invention relates generally to a means for protecting an internal combustion engine from damage resulting from the induction of excessive contaminants, and more particularly to such a means for automatically stopping, or severely restricting the output of an engine when the intake air stream contains an excessive amount of contaminants.

In a conventional internal combustion engine, an air cleaner is provided to trap and retain dirt, and other contaminants, which would otherwise be inducted into the cylinders along with the air necessary for proper combustion.

However, the air cleaner, while not capable of trapping and retaining all contaminants, is nevertheless very efficient, and will become clogged or congested thereby requiring periodic maintenance. The maintenance or service procedure necessitates the disassembly of the air cleaner housing and removal of the element to permit the purging of those contaminants retained thereby. All too frequently during such procedures, the element is damaged or the housing is reassembled incorrectly, i.e., the various components of the housing are mechanically connected but are not in sealing engagement with the element. In either case, a path may be provided through the air cleaner, which path is unobstructed and devoid of filtering action, thereby subjecting the engine to dirt laden air. When such a situation occurs, rapid wear of the engine components results, often concluding in complete failure of the engine, without the operator thereof being aware of the malfunction.

It is, therefore, an object of the present invention to provide the means for automatically stopping, or severely restricting the power output of, an engine upon failure of the air cleaner.

It is also an object of this invention to provide a means for protecting an internal combustion engine from damage due to induction of excessive amounts of contaminants, and which will alert an operator thereof to the presence of such excessive contaminants by noticeably reducing the power output from the engine.

These and other objects, and many of the attendant advantages, of the present invention will become more readily apparent upon a perusal of the following description and the accompanying drawings, wherein.

Figure 1:
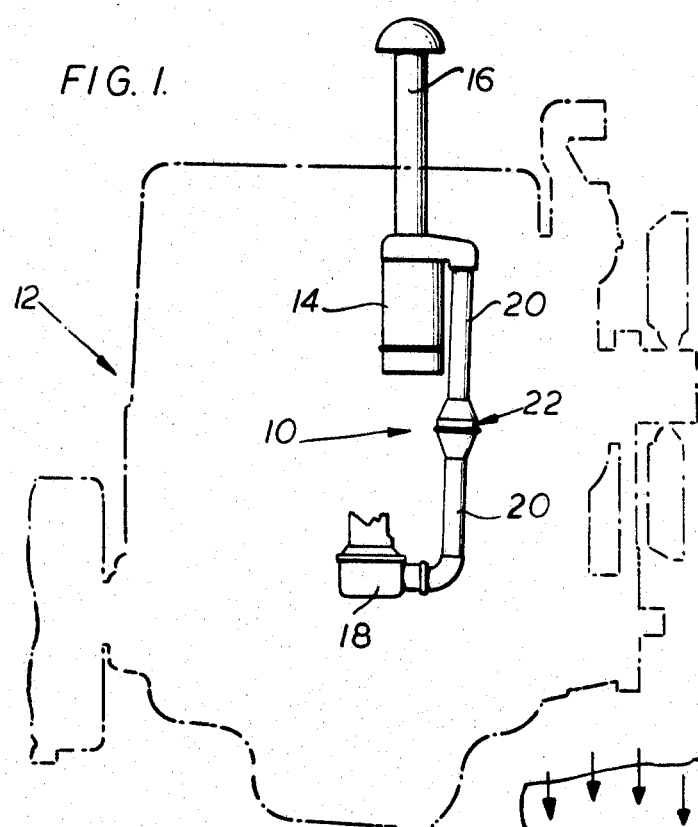
FIGURE 1 is a side elevational view of an induction system for an internal combustion engine which incorporates the preferred embodiment of the present invention.
Figure 2:
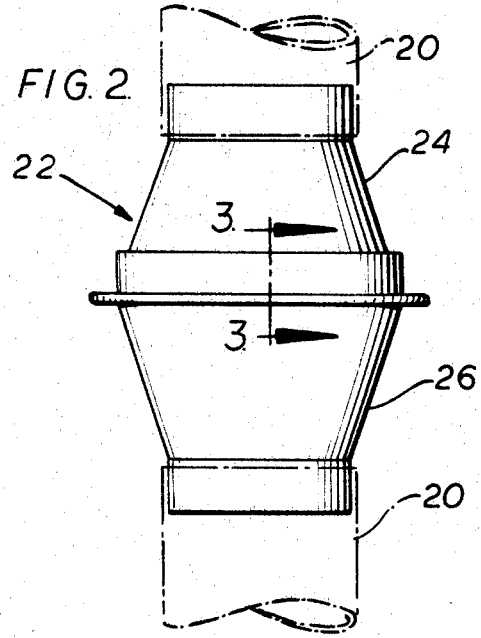
FIGURE 2 is a side elevational view of the safety filter shown in FIGURE 1.
Figure 3:
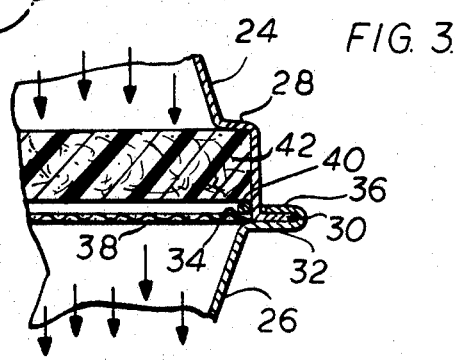
FIGURE 3 is a cross sectional view taken on line 3—3 of FIGURE 2.

Referring now to the drawings, there is shown in FIGURE 1 an induction system 10 for an internal combustion engine, the outline of which is shown by dotted lines and indicated generally as 12, which includes an intake tube 16 connected to a conventional air cleaner 14, a normal induction apparatus 18, which may be a carburetor if the engine is spark ignited or the plenum for the intake manifold if the engine is combustion ignited. A tubular conduit 20 is connected between the air cleaner 14 and the induction apparatus 18 to effect fluid communication therebetween. The safety filter 22 is interposed in this conduit 20. The safety filter 22, as shown in FIGURES 2 and 3, comprises a diverging section 24 and a converging section 26. The diverging section is provided with a shoulder 28 and an outwardly extending flange 30. The converging section 26 is also provided with a flange 32, which flange forms an internal shoulder 34 and is folded back at 36 and crimped around the flange 30 to form an air tight connection between the two sections 24 and 26. A single layer filter element 38 is pivoted within the diverging section 24 and rests upon the shoulder 34 formed by the flange 32. An O-ring 40 frictionally engages the interior wall of the diverging section 24 to retain the filter element 38 in its position, such restraint being necessary to prohibit the element 38 from being dislodged in the event of a backfire. A diffuser element 42 is positioned within the diverging section 24 and abuts against the shoulder 28, being spaced a small distance from the element 38 by the O-ring 40. The purpose of the diffuser element 42, which may consist of a disc made from fiberglass of the type commonly used in residential furnace filters, is to achieve a uniform velocity profile over the entire area of the element 38. Preferably the element 38 is formed from 250 mesh Phosphor-bronze wire screening, which provides a 62 micron opening, i.e., about 36 percent of the area of the element 38 is open area available to permit the flow of air therethrough. Analyzing the element 38 by those standards normally applied to a filter, this element is intended to be inefficient and to have fairly good migration properties. The reason for this is that the air cleaner 14 upstream of the safety filter 22 is itself only about 97 percent efficient and thus approximately 3 percent of the particles pass through the air cleaner. These particles, which are of very small size, reach the safety filter and if it were efficient would, after a period of engine operation, clog the filter 38. Since the element should not be effected by those particles passing through the air cleaner, the filter 38 is sized to pass them. An engine can tolerate, without appreciable wear, a small amount of particles of a size less than 62 microns. Thus, the element 38 passes most of these particles, and having good migration properties, permits those particles which are retained initially to free themselves and pass through the safety filter as air continues to flow therethrough. However, the filter element 38 will not pass large particles, which could do extensive damage to the engine, but will retain them. In addition, if small particles are fed to the element 38 at a high rate, as would be the case when the air cleaner 14 malfunctions, the filter element will not pass them and the amount of open area through which the incoming air may flow is reduced. Restriction of the air flow results in a loss of power output from the engine and when the air supplied is insufficient to support combustion total loss of power results. When this occurs, the safety filter has to be removed from the conduit 20 and replaced or cleaned. While this may involve a costly and time consuming operation, as compared with the servicing of an air cleaner, the engine will have been preserved where it otherwise would have been severely damaged.

If the air cleaner 14 is functioning properly, the safety filter will not receive any large particles and will receive small particles only at a very low rate. These small particles will be passed by the element 38 because of its good migration properties. Thus, the element 38 should remain unclogged and require no service during the life of the engine if the air cleaner is functioning properly. In the event of an air cleaner malfunction, the element 38 will become clogged rapidly and thereby severely restrict the flow of air to the engine. This sudden loss of power will provide a warning to the operator of the danger and permit the engine to be stopped to correct the defect. Should the warning provided by the loss of power be ignored, continued operation of the engine will restrict the air flow to the point that combustion is no longer possible and the engine will cease operation.

It is to be understood that the diffuser 42 is utilized simply to achieve a uniform distribution of the air over the entire area of the filter element 38 and itself does no filtering. That is, its migration properties at the velocities encountered in the intake of the engine should be as good as, and preferably superior to, those of the element 38. In addition the diffuser 42 should be capable of passing particles which are capable of being trapped by the element 38. The use of a diffuser makes possible a more compact filter 22, and it could be eliminated, in the event that space is not a determining factor, by increasing the length and diameter of the filter 22 in order that the velocity distribution across the element 38 is uniform and less than the velocity through the conduit 20.

While one embodiment of the present invention has been shown and described herein, it is to be understood that various modifications and alterations may be made therein without departing from the spirit of the invention as defined by the scope of the accompanying claims.

What is claimed is:

1. In combination with an engine having an intake manifold, an air cleaner for removing dirt particles from the air inducted into the engine, which air cleaner normally has an efficiency of about 97% so that it passes particles at a given rate when operating properly and passes particles at a rate greater than said given rate when operating improperly, and conduit means connecting said cleaner to said manifold, the improvement comprising:

safety filter means for passing substantially all particles of a size smaller than 62 microns when received at said given rate and for retaining, when received at said greater rate, a sufficient number of particles to restrict the flow of air to the engine;

said safety filter means being interposed in said conduit means and positioned to receive those particles passing through said cleaner;

whereby the power output of the engine is substantially reduced whenever, but only when, the air cleaner is operating improperly.

2. In the combination according to claim 1 wherein said safety filter means comprises a single layer filter element.

3. In the combination according to claim 2 and further comprising diffuser means positioned upstream of said element and in close proximity thereto to provide a uniform velocity distribution across said element.

4. In the combination according to claim 3 wherein said element comprises a single layer of woven cloth having approximately 36 percent open area.

5. In the combination according to claim 4 wherein said woven cloth comprises 250 mesh Phosphor-bronze wire screening.

6. In the combination according to claim 5 wherein said diffuser means comprises a layer of fiberglass material capable of passing particles larger than those retained by said screening.

7. In the combination according to claim 6 and further comprising:

a diverging section having its smaller end connected to said conduit means to permit air to flow toward its larger end, a converging section having its smaller end connected to said conduit means; and said sections connected together in sealing engagement and retaining said element transversely of said conduit means.

References Cited

UNITED STATES PATENTS

| | | | |
|---|---|---|---|
| 37,500 | 1/1863 | Fontain | 55—503 X |
| 310,157 | 12/1884 | Weisenflue | 55—503 X |
| 1,070,449 | 8/1913 | Green et al. | |
| 1,398,685 | 11/1921 | Gordon. | |
| 1,888,150 | 11/1932 | Walker | 55—503 |
| 2,087,688 | 7/1937 | Johnson | 55—503 X |
| 2,655,041 | 10/1953 | Jacobson. | |
| 2,980,203 | 4/1961 | Lutke | 55—503 X |
| 3,102,014 | 8/1963 | Aitkenhead. | |
| 3,123,456 | 3/1964 | Boltz et al. | |
| 3,298,149 | 1/1967 | Sobeck | 55—318 X |

HARRY B. THORNTON, *Primary Examiner.*

S. W. SOKOLOFF, *Assistant Examiner.*